US009254468B2

(12) United States Patent
Van Horn et al.

(10) Patent No.: US 9,254,468 B2
(45) Date of Patent: *Feb. 9, 2016

(54) STABLE FORMULATED SYSTEMS WITH CHLORO-3,3,3-TRIFLUOROPROPENE

(71) Applicant: Arkema Inc., King of Prussia, PA (US)

(72) Inventors: Brett L. Van Horn, King of Prussia, PA (US); Maher Y. Elsheikh, Wayne, PA (US); Benjamin Bin Chen, Wayne, PA (US); Philippe Bonnet, Lyons (FR)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/132,263

(22) Filed: Dec. 18, 2013

(65) Prior Publication Data

US 2014/0103248 A1    Apr. 17, 2014

Related U.S. Application Data

(63) Continuation of application No. 13/738,211, filed on Jan. 10, 2013, now abandoned, and a continuation of application No. 12/667,121, filed as application No. PCT/US2009/036267 on Mar. 6, 2009, now abandoned.

(60) Provisional application No. 61/034,513, filed on Mar. 7, 2008.

(51) Int. Cl.
| | |
|---|---|
| *C08J 9/14* | (2006.01) |
| *C07C 21/18* | (2006.01) |
| *B01F 17/00* | (2006.01) |
| *C09K 5/04* | (2006.01) |
| *C09K 5/00* | (2006.01) |
| *C10M 171/00* | (2006.01) |

(52) U.S. Cl.
CPC .............. *B01F 17/0085* (2013.01); *C09K 5/00* (2013.01); *C09K 5/044* (2013.01); *C10M 171/008* (2013.01); *C10M 2203/065* (2013.01); *C10M 2205/0285* (2013.01); *C10M 2207/2835* (2013.01); *C10M 2209/043* (2013.01); *C10M 2209/1033* (2013.01); *C10N 2220/302* (2013.01)

(58) Field of Classification Search
CPC .............. C08J 9/146; C08J 9/14; C08J 9/144; C08J 9/149; C08J 2201/024; C07C 21/18; C07C 21/185
USPC ............ 521/131, 170, 98, 88; 252/67, 68, 69; 570/135; 264/53
See application file for complete search history.

(56) References Cited

U.S. PATENT DOCUMENTS

| | | |
|---|---|---|
| 5,710,352 A | 1/1998 | Tung |
| 5,730,894 A | 3/1998 | Minor et al. |
| 5,851,436 A | 12/1998 | Merchant et al. |
| 6,013,846 A | 1/2000 | Wismer et al. |
| 6,120,652 A | 9/2000 | Hibino et al. |
| 6,306,943 B1 | 10/2001 | Henry |
| 6,316,681 B1 | 11/2001 | Yoshikawa |
| 7,094,936 B1 | 8/2006 | Owens et al. |
| 7,183,448 B2 | 2/2007 | Nakada et al. |
| 7,438,825 B1 | 10/2008 | Chen et al. |
| 7,438,826 B1 | 10/2008 | Chen et al. |
| 7,442,321 B1 | 10/2008 | Chen et al. |
| 7,479,238 B1 | 1/2009 | Chen et al. |
| 7,479,283 B1 | 1/2009 | Novotny |
| 8,338,355 B2 | 12/2012 | Ishihara et al. |
| 8,557,136 B2 * | 10/2013 | Van Horn et al. ............... 252/67 |
| 2004/0089839 A1 | 5/2004 | Thomas et al. |
| 2005/0085674 A1 | 4/2005 | Nakada et al. |
| 2005/0101810 A1 | 5/2005 | Owens et al. |
| 2005/0263736 A1 | 12/2005 | Minor et al. |
| 2006/0217516 A1 | 9/2006 | Casati et al. |
| 2007/0007488 A1 | 1/2007 | Singh et al. |
| 2007/0108403 A1 | 5/2007 | Sievert et al. |
| 2007/0187639 A1 | 8/2007 | Leck et al. |
| 2007/0246682 A1 | 10/2007 | Minor et al. |
| 2009/0099274 A1 | 4/2009 | Van Der Puy et al. |
| 2010/0087557 A1 | 4/2010 | Chen et al. |
| 2010/0105788 A1 | 4/2010 | Chen et al. |
| 2010/0105789 A1 | 4/2010 | Van Horn et al. |
| 2010/0113629 A1 | 5/2010 | Van Horn et al. |
| 2010/0174008 A1 | 7/2010 | Enaux et al. |
| 2010/0222443 A1 | 9/2010 | Enaux et al. |
| 2011/0041529 A1 | 2/2011 | Chen et al. |
| 2011/0152392 A1 | 6/2011 | Van Der Puy |
| 2011/0309288 A1 | 12/2011 | Chen et al. |
| 2012/0138847 A1 * | 6/2012 | Van Horn et al. ............... 252/68 |

FOREIGN PATENT DOCUMENTS

| | | | |
|---|---|---|---|
| EP | 0 539 719 A1 | 9/1992 | |
| EP | 0 533 202 A1 | 3/1993 | |

(Continued)

OTHER PUBLICATIONS

Chemical Thermal Stability of Refrigerant-Lubricant Mixtures with Metals—Dietrich F. Huttenlocher—DOE/CE/23810-5 ARTI MCLR Project 650-50200—The Air-Conditioning and Refrigeration Technology Institute—Oct. 9, 1992—pp. 1-140.

*Primary Examiner* — Douglas McGinty
(74) *Attorney, Agent, or Firm* — Steven D. Boyd

(57) ABSTRACT

The present invention relates to formulated refrigerant systems of 1-chloro-3,3,3-trifluoropropene (R-1233zd) that are sufficiently thermally and chemically stable such that they can be effectively used sans additional stabilizers. The formulations of the present invention are particularly useful compositions for refrigeration, heat transfer and foam blowing.

12 Claims, No Drawings

(56) References Cited

FOREIGN PATENT DOCUMENTS

| | | |
|---|---|---|
| JP | 10101593 A | 4/1998 |
| WO | WO 2005/094395 A2 | 10/2005 |
| WO | WO 2005/119142 A2 | 12/2005 |
| WO | WO 2007/002625 A2 | 1/2007 |
| WO | WO 2007/002703 A2 | 1/2007 |
| WO | WO 2008/027512 A2 | 3/2008 |
| WO | WO 2008/027513 A2 | 3/2008 |
| WO | WO 2008/027514 A1 | 3/2008 |
| WO | WO 2008/027515 A2 | 3/2008 |
| WO | WO 2008/027516 A1 | 3/2008 |
| WO | WO 2008/027517 A1 | 3/2008 |
| WO | WO 2008/027518 A2 | 3/2008 |
| WO | WO 2008/027595 A1 | 3/2008 |
| WO | WO 2008/027596 A2 | 3/2008 |
| WO | WO 2008/121783 A1 | 10/2008 |
| WO | WO 2009/003165 A1 | 12/2008 |
| WO | WO 2010/062572 A2 | 6/2010 |
| WO | WO 2010/077898 A2 | 7/2010 |

* cited by examiner

STABLE FORMULATED SYSTEMS WITH CHLORO-3,3,3-TRIFLUOROPROPENE

This application is a continuation application of U.S. application for patent Ser. No. 13/738,211 filed Jan. 10, 2013 which claims priority to U.S. application for patent Ser. No. 12/667,121 filed Dec. 29, 2009, abandoned, which claims priority to International application for patent Serial Number PCT/US2009/036267 filed Mar. 6, 2009 which designated the United States, which claimed priority to U.S. provisional application for patent Ser. No. 61/034,513 filed Mar. 7, 2008.

FIELD OF THE INVENTION

The present invention relates to formulated systems of 1-chloro-3,3,3-trifluoropropene (R-1233zd) and/or 2-chloro-3,3,3-trifluoropropene (R-1233xf) that are sufficiently thermally and chemically stable such that they can be effectively used without the need for additional stabilizers. The formulations of the present invention are particularly useful compositions for refrigeration, heat transfer, and foam pre-mixes.

BACKGROUND OF THE INVENTION

With continued regulatory pressure there is a growing need to identify more environmentally sustainable replacements for refrigerants, heat transfer fluids, foam blowing agents, solvents, and aerosols with lower ozone depleting and global warming potentials. Chlorofluorocarbon (CFC) and hydrochlorofluorocarbons (HCFC), widely used for these applications, are ozone depleting substances and are being phased out in accordance with guidelines of the Montreal Protocol. Hydrofluorocarbons (HFC) are a leading replacement for CFCs and HCFCs in many applications. Though they are deemed "friendly" to the ozone layer they still generally possess high global warming potentials. One new class of compounds that has been identified to replace ozone depleting or high global warming substances are halogenated olefins, such as hydrofluoroolefins (HFO) and hydrochlorofluoroolefins (HCFO). Because of the presence of alkene linkage it is expected that the HFOs and HCFOs will be chemically unstable, relative to HCFCs or CFCs. The inherent chemical instability of these materials in the lower atmosphere results in short atmospheric lifetimes, which provide the low global warming potential and zero or near zero ozone depletion properties desired. However, such inherent instability is believed to also impact the commercial application of such materials, which may degrade during storage, handling and use.

WO 2009/003165 discloses stabilized formulations of HFOs and HCFOs in a variety of applications and compositions. This patent application discloses that stabilizers can be used to inhibit decomposition of HCFO-1233zd during use. WO 2007/002625 discloses the use of various tetrafluoropropenes in a variety of applications including heat transfer systems. The patent application discloses the stability of HFO-1234ze, HFO-1243zf, and HFO-1225ye with selected PAG lubricating oils and compares the results to that of CFC-12 in a mineral oil, using the results to state the refrigerants and compositions of that patent application have better stability than many commonly used refrigerants.

WO08027596, WO08027595, WO08027518, WO08027517, WO08027516, WO08027515, WO08027513, WO08027512, WO08027514 all are directed towards stabilized systems of fluoroolefins. These applications disclose that fluoroolefins can exhibit degradation when exposed to high temperatures or when contacted with other compounds e.g., moisture, oxygen, or other compounds with which they may undergo condensation reactions. It is disclosed that the degradation may occur when fluoroolefins are used as working fluids in heat transfer equipment (refrigeration or air-conditioning equipment, for instance) or when used in some other application. It is disclosed that because of the instability of the fluoroolefins, it may not be practical to incorporate these fluoroolefins into refrigeration or air-conditioning systems. Therefore, to take advantage of the many other attributes of fluoroolefins, means to reduce the degradation via the addition of a stabilizer is needed.

In the present invention, it was discovered that HCFO-1233zd (trans- and/or cis-isomers) and HCFO-1233xf are unexpectedly stable during storage and use without the need for an added stabilizer, being as stable or significantly more stable the many HCFCs and CFCs while being more environmentally sustainable.

SUMMARY OF THE INVENTION

The present invention relates to formulated systems of trans- and/or cis-1-chloro-3,3,3-trifluoropropene (HCFO-1233zd) and/or 2-chloro-3,3,3-trifluoropropene (HCFO-1233xf) that are sufficiently thermally and chemically stable such that they can be effectively used without the need for additional stabilizers. The formulations of the present invention are particularly useful compositions for refrigeration, heat transfer, and foam pre-mixes. Stability results for select HCFCs are provided in "Chemical and Thermal Stability of Refrigerant-Lubricant Mixtures with Metals", by DF Huttenlocher Spauschus Inc., in DOE/CE/23810-5 (1992). The stated findings were that R-123 is approximately ten times more stable than R-11, and that R-141b and R-142b are more stable than R-123, EP0539719 discloses that R-141b should be used with a stabilizer, such as alpha-methylstyrene, to inhibit the formation of the toxic byproduct 1-chloro-1-fluoroethylene (HCFO-1131a). The present inventors discovered that HCFO-1233zd, without any additional stabilizer, was at least as stable as R-141b, and by extension it is also more stable than R-123 and R-11.

DETAILED DESCRIPTION OF THE INVENTION

With continued regulatory pressure there is a growing need to identify more environmentally sustainable replacements for refrigerants, heat transfer fluids, foam blowing agents, solvents, and aerosols with lower ozone depleting and global warming, potentials. Chlorofluorocarbon (CFC) and hydrochlorofluorocarbons (HCFC), widely used for these applications, are ozone depleting substances and are being phased out in accordance with guidelines of the Montreal Protocol. Hydrofluorocarbons (HFC) are a leading replacement for CFCs and HCFCs in many applications; though they are deemed "friendly" to the ozone layer they still generally possess high global warming potentials. One new class of compounds that has been identified to replace ozone depleting or high global warming substances are halogenated olefins, such as hydrofluoroolefins (HFO) and hydrochlorofluoroolefins (HCFO). Because of the presence of alkene linkage it is expected that the HFOs and HCFOs will be chemically unstable, relative to preceding HCFC or CFC. The inherent chemical instability of these materials in the lower atmosphere results in short atmospheric lifetimes, which provide the low global warming potential and zero or near zero ozone depletion properties desired. However, such inherent instability is believed to also impact the commercial application of such materials, which may degrade during storage, handling and use, such as when exposed to high temperatures or when contacted with other compounds e.g., moisture, oxygen, or other compounds with which they may undergo condensation reactions. This degradation may occur when halo-olefins are used as working fluids in heat transfer equipment (refrigeration or air-conditioning equipment, for instance) or when used in some other application. This degradation may occur by any number of different mechanisms. In one instance, the degradation may be caused by instability of the compounds at extreme temperatures. In other instances, the degradation may be caused by oxidation in the presence of air that has inadvertently leaked into the system. Whatever the cause of such degradation, because of the instability of the halo-olefins, it may not be practical to incorporate these halo-olefins into refrigeration or air-conditioning systems, or in other applications such as in foam polyol pre-mixes.

Good understanding of the chemical interactions of the refrigerant, lubricant, and metals in a refrigeration system is necessary for designing systems that are reliable and have a long service life. Incompatibility between the refrigerant and other components of or within a refrigeration or heat transfer system can lead to decomposition of the refrigerant, lubricant, and/or other components, the formation of undesirable byproducts, corrosion or degradation of mechanical parts, loss of efficiency, or a general shortening of the service life of the equipment, refrigerant and/or lubricant.

In the present invention, it was discovered that the halogenated olefins HCFO-1233zd and/or HCFO-1233xf are unexpectedly stable, sans additional stabilizing agents, in systems typical of refrigeration, air conditioning, heat transfer systems, including within the presence of lubricants, metals, and moisture. It was discovered that halogenated olefins HCFO-1233zd and/or HCFO-1233xf is at least if not more stable than similar HCFC and CFC refrigerants, including R-141b, R-123, and R-11, and can therefore be particularly useful as a refrigerant or heat transfer fluid while providing both the benefits of an extended service life as well as greater environmental sustainability.

In a refrigeration, air conditioning, or heat transfer system, lubricating oil and refrigerant are expected to be in contact with each other in at least some parts of the system, if not most of the system, as explained in the ASHRAE Handbook: HVAC Systems and Equipment. Therefore, whether the lubricant and refrigerant are added separately or as part of a pre-mixed package to a refrigeration, air conditioning, or heat transfer system, they are still expected to be in contact within the system and must therefore be compatible.

In one embodiment of the present invention, the stable halogenated olefin systems are refrigeration, air conditioning, or heat transfer systems comprising chloro-3,3,3-trifluoropropene, preferably HCFO-1233A in such a system the HCFO-1233zd will be in contact with various metals and other components and must remain stable for extended operation. Typical materials which are present in such systems include steel, stainless steel, aluminum, iron, copper, and mixtures thereof. In another embodiment of the present invention said stable systems also comprising lubricants, including mineral oils, alkyl benzene oils, polyvinyl ether oils, polyol ester oils, polyalkylene glycol oils, poly(alpha-olefin) oils, and mixtures thereof.

The stable halogenated olefin systems comprising chloro-3,3,3-trifluoropropene, preferably 1-chloro-3,3,3-trifluoropropene (R-1233zd), 2-chloro-3,3,3-trifluoropropene (R-1233xf), and mixtures thereof, and even more preferably trans-1-chloro-3,3,3-trifluoropropene are intended to include new systems, servicing of existing systems, and retrofitting of existing systems. The preferred chloro-3,3,3-trifluoropropene is trans-1-chloro-3,3,3-trifluoropropene comprising greater than 70 wt % trans isomer. For example, due to the stability of chloro-3,3,3-trifluoropropene with lubricants and metals, chloro-3,3,3-trifluoropropene can be used to service existing equipment already containing other refrigerants including, but not limited to, HCFC-123 and/or CFC-11, without worsening the system stability. This can include adding chloro-3,3,3-trifluoropropene, either alone or in combination with other refrigerants, to said existing equipment in order to top-off a refrigerant charge or by removing part or all of said existing refrigerant and then replacing it with chloro-3,3,3-trifluoropropene, alone or in combination with other refrigerants.

Chloro-3,3,3-trifluoropropene can also be charged to new equipment, alone or in combination with other refrigerants such as hydrofluorocarbons, hydrochlorofluorocarbons, hydrofluoroolefins, hydrofluorochlorocarbons, hydrocarbons, hydrofluoroethers, fluoroketones, chlorofluorocarbons, trans-1,2-dichloroethylene, carbon dioxide, ammonia, and mixtures thereof. Exemplary hydrofluorocarbons include difluoromethane (HFC-32); 1-fluoroethane (HFC-161); 1,1-difluoroethane (HFC-152a); 1,2-difluoroethane (HFC-152); 1,1,1-trifluoroethane (HFC-143a); 1,1,2-trifluoroethane (HFC-143); 1,1,1,2-tetrafluoroethane (HFC-134a); 1,1,2,2-tetrafluoroethane (HFC-134); 1,1,1,2,2-pentafluoroethane (HFC-125); 1,1,1,3,3-pentafluoropropane (HFC-245fa); 1,1,2,2,3-pentafluoropropane (HFC-245ca); 1,1,1,2,3-pentafluoropropane (HFC-245eb); 1,1,1,3,3,3-hexafluoropropane (HFC-236fa); 1,1,1,2,3,3,3-heptafluoropropane (HFC-227ea); 1,1,1,3,3-pentafluorobutane (HFC-365mfc), 1,1,1,2,3,4,4,5,5,5-decafluoropropane (HFC-4310), and mixtures thereof. Exemplary chlorofluorocarbons include trichlorofluoromethane (R-11), dichlorodifluoromethane (R-12), 1,1,2-trifluoro-1,2,2-trifluoroethane (R-113), 1,2-dichloro-1,1,2,2-tetrafluoroethane (R-114), chloro-pentafluoroethane (R-115) and mixtures thereof. Exemplary hydrocarbons include propane, butane, isobutane, n-pentane, iso-pentane, neo-pentane, cyclopentane, and mixtures thereof. Exemplary hydrofluoroolefins include 3,3,3-trifluoropropene (HFO-1234zf), E-1,3,3,3-tetrafluoropropene, 2,3,3,3-tetrafluoropropene (HFO-1234yf), E-1,2,3,3,-pentafluoropropene (E-HFO-1255ye), Z-1,2,3,3,3-pentafluoropropene (Z-HFO-125ye), E-1,1,1,3,3,3-hexafluorobut-2-ene (E-HFO-1336mzz), Z-1,1,1,3,3,3-hexafluorobut-2-ene (Z-HFO-1336mzz), 1,1,1,4,4,5,5,5-octafluoropent-2-ene (HFO-1438mzz) and mixtures thereof. Exemplary hydrofluoroethers include 1,1,1,2,2,3,3-heptafluoro-3-methoxy-propane, 1,1,1,2,2,3,3,4,4,-nonafluoro-4-methoxy-butane and mixtures thereof. An exemplary fluoroketone is 1,1,1,2,2,4,5,5,5-nonafluoro-4(trifluoromethyl)-3-3pentanone.

In another embodiment of the present invention, a stable pre-blend formulation can be prepared by mixing chloro-3,3,3-trifluoropropene, alone or in combination with other refrigerants, with a lubricant sans additional stabilizer. The stable system refrigerant/lubricant pre-blend can then be charged to a refrigeration, air conditioning, or heat transfer system.

For the production of polyurethane foams, it is typical to prepare a polyol pre-mixture (typically referred to as the B-side) that contains the blowing agent. This B-side foam pre-mix will form foam when mixed with a polymeric MDI mixture (typically referred to as the A-side). The B-side foam pre-mix formulation must remain chemically and thermally stable before being mixed with the A-side formulation to prevent problems such as the creation of undesirable byproducts, decomposition of B-side components, undesired polymerization etc. These can decrease the efficiency of the foaming formulation, produce toxic or reactive components, produce more volatile components that could increase the pressure of the B-side container, etc. It was discovered in the present invention that HCFO-1233zd and/or HCFO-1233xf are unexpectedly stable in B-side polyol foam pre-mixes sans additional stabilizer, being at least if not more stable than preceding HCFC blowing agents in polyol foam pre-mixes, such as HCFC-141b. Foam pre-mixes containing HFCO-1233zd and/or HCFO-1233xf will bring the benefit of added shelf life compared to pre-mixes of HCFC-141b.

The following non-limiting examples are hereby provided as reference:

EXAMPLES

The compatibility and stability of refrigerants in the presence of lubricating oils, moisture, and metals was tested at elevated temperatures in 300 mL stainless steel autoclaves. The 300 mL autoclaves were first loaded with approximately 10 g of oil, 1 g of water, and coupons or chips of active metals: aluminum, copper, and iron. To each autoclave was added approximately 10 to 11 g of refrigerant, The autoclaves were sealed and placed in a constant temperature oven at 140° C. for 48 hours. After which the autoclaves were allowed to cool and then the vapor space was analyzed by gas chromatography (GC) to check for decomposition and identify degradation products.

In calculating the purity of the refrigerant, some of the impurities contained in the starting material were subtracted from the GC scans to better reflect changes in purity of the refrigerant and better identify the appearance of degradation products.

Example 1

The compatibility and stability of trans-HCFO-1233zd in the presence of lubricating oils and metals was tested at elevated temperatures in stainless steel autoclaves following the procedure described previously. The lubricants tested in three separate autoclaves were AB-150, MO-150, and POE-22. In a fourth autoclave, trans-HCFO-1233zd was tested without lubricant, moisture, or the metal chips to be used as a reference sample. The original HCFO-1233zd contained from I to 2% impurities, primarily HFO-1234ze and HFC-245fa, which were subtracted out of the GC scans as described previously.

Table 1 shows the purity of the samples following the stability tests. The purity of the HCFO-1233zd remained greater than 99% in all cases. The primary impurities in the samples containing oil were dimethyl terephthalate and diethylphthalate which were not decomposition products of the HCFO-1233zd.

Comparative Example 2

The compatibility and stability of HCFC-141b in the presence of lubricating oils and metals was tested at elevated temperatures in stainless steel autoclaves following the procedure of example 1, except replacing the HCFO-1233zd with HCFC-141b. The HCFC-141b contained approximately 0.02% alpha-methylstyrene as a stabilizer. The HCFC-141b taken from the reference sample remained fairly pure at greater than 99.9%. The HCFC-141b showed signs of significant decomposition when in the presence of lubricating oils, metals, and moisture, with the appearance of numerous degradation products, such as 1,1-dichloroethylene, and particularly with a significant increase in the level of 1-chloro-1-fluoroethylene (HCFO-1131a), from less than 15 ppm for the reference sample to over 1500 ppm or even over 3300 ppm for the samples containing the oils. These results are shown in Table 1. The stainless steel autoclaves containing lubricants showed significant discoloration (darkening) or corrosion in areas contacted by the other metals. This corrosion could not be removed by simple scrubbing or washing. Corrosion of this type was not observed in Example 1. Comparative Example 2 shows that HCFO-1233zd is at least as stable as HCFC-141b, even when the HCFC-141b is stabilized to inhibit decomposition.

TABLE 1

Refrigerant purity following stability testing with lubricants

| Example | Refrigerant | Reference | AB-150 | MO-150 | POE-22 |
|---|---|---|---|---|---|
| 1 | 1233zd | 99.97% | 99.43% | 99.18% | 99.59% |
| 2 | 141b (1131a) | 99.98% (13 ppm) | 98.49% (~1500 ppm) | 99.07% (~3300 ppm) | 99.08% (~1800 ppm) |

Examples 3 and 4 and Comparative Examples 5 and 6

The compatibility and stability of trans-HCFO-1233zd and HCFC-141b were tested in the presence of lubricating oils similar to as in Example 1 and comparative example 3, with the following modifications: In examples 3 and 4, two autoclaves were prepared with HCFO-1233zd with MO-150 and POE-22 respectively, as was done in example 1. In comparative examples 5 and 6, two autoclaves were prepared with HCFC-141b, containing alpha-methylstyrene as a stabilizer, with MO-150 and POE-22 respectively, as was done in comparative example 2. The autoclaves were maintained at 140° C.; for 96 hours, instead of 48 hours. The vapor space of each autoclave was sampled and tested by GC/MS both before and after the stability tests. The results are shown in Table 2.

The purity of the HCFO-1233zd changed by only 0.03% or less while the purity of the HCFC-141b changed by greater than 0.3%. The primary decomposition byproduct for HCFO-141b was HCFO-1131a, increasing from 11 ppm to over 1400 ppm.

TABLE 2

Refrigerant purity following stability testing with lubricants

| | | | Purity | | |
|---|---|---|---|---|---|
| Example | Refrigerant | Oil: | Before | After | Change |
| 3 | HCFO-1233zd | MO-150 | 99.99% | 99.98% | 0.01% |
| 4 | HCFO-1233zd | POE-22 | 99.97% | 99.94% | 0.03% |
| 5 | HCFC-141b (1131a) | MO-150 | 99.95% (11 ppm) | 99.64% (~1900 ppm) | 0.31% |
| 6 | HCFC-141b (1131a) | POE-22 | 99.71% (11 ppm) | 98.97% (~1400 ppm) | 0.74% |

Example 7

A sample of HCFO-1233zd, containing trans- and cis-isomers in a ratio of approximately 7:3, was stored in a clear glass vial for over ten years in uncontrolled ambient conditions. Following the storage period the sample was visually observed and tested by GC analysis. The sample still looked clear and unchanged and GC analysis showed no significant change in sample composition. This example shows that HCFO-1233zd is stable during extended storage conditions.

Comparative Example 8

A sample of R-11 from 1981 was stored in a 30 gallon steel drum. Following the storage period, the sample had turned yellow and emitted a strong odor. This example shows that HCFO-1233zd will be more stable than R-11 in storage and in use, especially in the presence of active metals, lubricants, and moisture.

Example 9 and Comparative Example 10

The chemical and thermal stability of HCFO-1233zd and HFO-1234ze B-side polyol formulations were tested in stainless steel autoclaves as follows:

Each foam pre-mix formulation was loaded into a 300 mL stainless steel autoclave. The autoclaves were heated in a constant temperature oven for 24 hours at 100° C. The autoclaves were then removed from the oven and kept at ambient temperature for 72 hours, after which for each a sample of the vapor space composition was collected into a Tedlar® GC sample bag for subsequent analysis by GC/MS.
To each autoclave was added the base B-side formulation shown in Table 3:

TABLE 3

B-side formulation

| B-Side | Parts | Wt % B | |
|---|---|---|---|
| Jeftol SG-360 | 35.0 | 39.2 | sucrose polyol |
| Jeffol R-425-X | 10.0 | 11.2 | mannich polyol |
| SF-265 | 20.0 | 22.4 | triethanol amine polyol |
| DEG | 5.0 | 5.6 | diethylene glycol |
| Dabco 33-LV | 0.5 | 0.6 | amine catalyst |
| Jeffcat ZR-70 | 0.5 | 0.6 | amine catalyst |
| Tegostab B 8465 | 2.1 | 2.4 | siloxane based surfactant |
| NP 9.5 | 15.1 | 16.9 | nonpehnol |
| Added water | 1.0 | 1.1 | |
| Total (w/o blowing agent) | 89.2 | 100% | |

Foam pre-mix formulations were then prepared by adding the blowing agents to the B-side formulations at a loading of 25 parts blowing agent to 75 parts B-side. One foam pre-mix formulation was prepared with HCFO-1233zd, example 9, and another with HFO-1234ze, comparative example 10. The foam pre-mix formulations were then subjected to the stability test.

The GC/MS analysis of the vapor phase composition of example 9 showed no significant degradation in the HCFO-1233zd. Most degradation byproducts were attributable to decomposition of HFO-1234ze, which was present at about 2% of the original HCFO-1233zd sample.

The HFO-1234ze of comparative example 10 showed more significant decomposition as shown by the GC/MS data provided in Table 4. The presence of the fluorinated silane products came from evolution of HIT from trans-HFO-1234ze, which in turn can react with more HFO-1234ze to yield HFC-245a and with the siloxane-based surfactants used in the formulation:

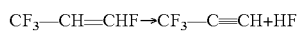

$$CF_3-CH=CHF \rightarrow CF_3-C\equiv CH + HF \quad 1)$$

$$HF + SiMe_3(OsiMe_2)nOSiMe_3 \rightarrow SiFMe_3 + nSiF_2Me_2 + H_2O \quad 2)$$

TABLE 4

Vapor analysis of Comparative Example 10

| | GC Area % | |
|---|---|---|
| | original 1234ze | After aging |
| trans-HFO-1234ze | 99.963 | 97.97 |
| HFC-245fa | 0 | 0.10 |
| Difluorodimethyl silane | 0 | 1.50 |
| Fluorotrimethyl silane | 0 | 0.17 |

Example 9 and comparative example 10 show that trans-HCFO-1233zd was more stable than the analogous hydrofluoroolefin trans-HFO-1234ze.

These examples show that chloro-3,3,3-trifluoropropenes, particularly HCFO-1233zd, are unexpectedly stable during both storage and use and at least as stable as prior HCFCs and CFCs, especially in combination with lubricants, moisture, active metals, polyol B-side formulations and mixtures thereof.

The invention claimed is:

1. A polyol B-side composition comprising polyol, catalyst, surfactant and a blowing agent composition comprising the halogenated olefin 1-chloro-3,3,3-trifluoropropene and less than about 2% of impurities selected from the group consisting of HFO-1234ze, HFC-245fa and mixtures thereof wherein more than about 99 wt % of said halogenated olefin remains after exposure of said composition to temperature of 100° C. for 24 hours.

2. The polyol B-side composition of claim 1 wherein said 1-chloro-3,3,3-trifluoropropene is predominantly trans-1-chloro-3,3,3-trifluoropropene.

3. The polyol B-side composition of claim 1 wherein said 1-chloro-3,3,3-trifluoropropene is greater than about 70% trans-1-chloro-3,3,3-trifluoropropene.

4. The polyol B-side composition of claim 1 wherein said 1-chloro-3,3,3-trifluoropropene is consists essentially of trans-1-chloro-3,3,3-trifluoropropene.

5. The polyol B-side composition of claim 1 further comprising a component selected from the group consisting of hydrofluorocarbons, hydrochlorofluorocarbons, hydrofluoroolefins, hydrofluorochlorocarbons, hydrocarbons, hydrofluoroethers, fluoroketones, chlorofluorocarbons, trans-1,2-dichloroethylene, carbon dioxide, ammonia, and mixtures thereof.

6. The polyol B-side composition of claim 5 wherein said hydrofluorocarbon is selected from the group consisting of difluoromethane (HFC-32); 1-fluoroethane (HFC-161); 1,1-difluoroethane (HFC-152a); 1,2-difluoroethane (HFC-152); 1,1,1-trifluoroethane (HFC-143a); 1,1,2-trifluoroethane (HFC-143); 1,1,1,2-tetrafluoroethane (HFC-134a); 1,1,2,2-tetrafluoroethane (HFC-134); 1,1,1,2,2-pentafluoroethane (HFC-125); 1,1,1,3,3-pentafluoropropane (HFC-245fa); 1,1,2,2,3-pentafluoropropane (HFC-245ca); 1,1,1,2,3-pentafluoropropane (HFC-245eb); 1,1,1,3,3,3-hexafluoropropane (HFC-236fa); 1,1,1,2,3,3-heptafluoropropane (HFC-227ea); 1,1,1,3,3-pentafluorobutane (HFC-365mfc), 1,1,1,2,3,4,4,5,5,5-decafluoropropane (HFC-4310), and mixtures thereof.

7. The polyol B-side composition of claim 5 wherein said hydrochlorofluorocarbon is selected from the group consisting of chlorodifluoromethane (HCFC-22), 1,1-dichloro-2,2,2-trifluoroethane (HCFC-123), 1-chloro-2,2,2-trifluoroethane (HCFC-124), 1,1-dichloro-1-fluoroethane (HCFC-141b), 1-chloro-1,1-difluoroethane (HCFC-142b), and mixtures thereof.

8. The polyol B-side composition of claim 5 wherein said chlorofluorocarbon is selected from the group consisting of trichlorofluoromethane (R-11), dichlorodifluoromethane (R-12), 1,1,2-trifluoro-1,2,2-trifluoroethane (R-113), 1,2-dichloro-1,1,2,2-tetrafluoroethane (R-114), chloro-pentafluoroethane (R-115) and mixtures thereof.

9. The polyol B-side composition of claim 5 wherein said hydrocarbon is selected from the group consisting of propane, butane, isobutane, n-pentane, iso-pentane, neo-pentane, cyclopentane, and mixtures thereof.

10. The polyol B-side composition of claim 5 wherein said hydrofluoroolefin is selected from the group consisting of 3,3,3-trifluoropropene (HFO-1234zf), E-1,3,3,3-tetrafluoropropene, 2,3,3,3-tetrafluoropropene (HFO-1234yf), E-1,2,3,3,-pentafluoropropene (E-HFO-1255ye), Z-1,2,3,3,3-pentafluoropropene (Z-HFO-125ye), E-1,1,1,3,3,3-hexafluorobut-2-ene (E-HFO-1336mzz), Z-1,1,1,3,3,3-hexafluorobut-2-ene (Z-HFO-1336mzz), 1,1,1,4,4,5,5,5-octafluoropent-2-ene (HFO-1438mzz) and mixtures thereof.

11. The polyol B-side composition of claim 5 wherein said hydrofluoroether is 1,1,1,2,2,3,3-heptafluoro-3-methoxy-propane, 1,1,1,2,2,3,3,4,4,-nonafluoro-4-methoxy-butane and mixtures thereof.

12. The polyol B-side composition of claim 5 wherein said fluoroketone is 1,1,1,2,2,4,5,5,5-nonafluoro-4(trifluoromethyl)-3-3pentanone.

\* \* \* \* \*